Dec. 17, 1963 H. L. MacDONELL 3,114,692
SEPARATION PROCESS
Filed April 27, 1961
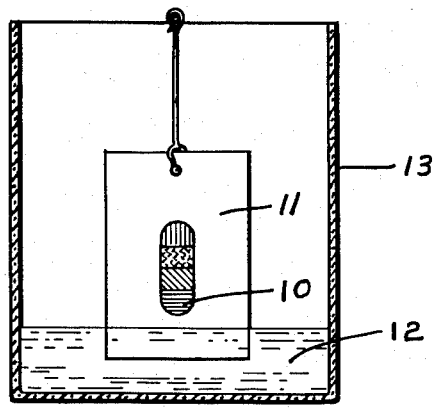
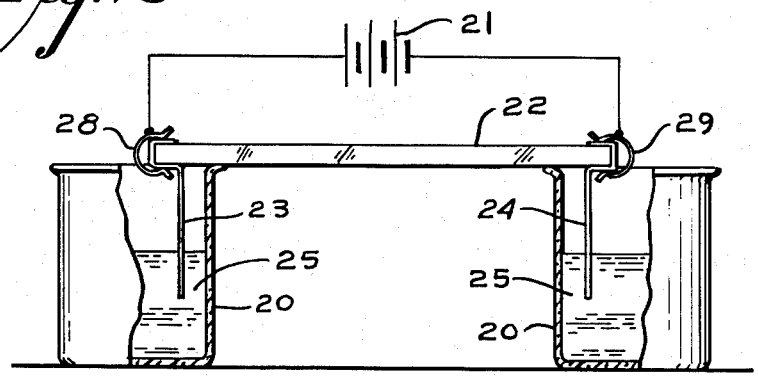
INVENTOR.
HERBERT L. MAC DONELL
BY
*Clarence R. Patty, Jr.*
ATTORNEY

United States Patent Office 3,114,692
Patented Dec. 17, 1963

3,114,692
SEPARATION PROCESS
Herbert L. MacDonell, Corning, N.Y., assignor to Corning Glass Works, Corning, N.Y., a corporation of New York
Filed Apr. 27, 1961, Ser. No. 105,979
2 Claims. (Cl. 204—180)

The present invention relates to processes for separating substances or mixtures of substances into their component parts and more particularly to processes of this type wherein separations are achieved by the use of porous media.

General processes for achieving such separations are well known and of great value in numerous commercial applications relating to both analysis and purification. The process of the present invention is applicable to all such types of separations among which are included chromatography and electrophoresis.

In the chromatography process mixtures of substances in solution are caused to separate as a result of both selective adsorption by and differential diffusion through porous media. Such media in the past have usually comprised either strips of paper having a fine and uniform pore structure, such as filter paper, or a column of solid adsorbent material such as starch, silica gel or alumina, and separation has been effected by placing on the medium a small quantity of the substance to be separated or a solution thereof and subsequently causing a solvent to permeate the medium of capillary action from one end thereof, thereby separating the substance into individual zones which move through the medium at differing rates.

In the process of electrophoresis a porous medium, such as a strip of filter paper, is saturated with an electrolyte, the substance to be separated or a solution thereof is placed on the saturated medium, and an electrical potential is imposed across the saturated medium resulting in differential migration of charged particles, relative displacement being a function of relative charges and masses.

The present invention results from the discovery of heretofore unrecognized advantages inherent in a previously known material and comprises the utilization of the unique properties of this material to provide a separation process having numerous substantial advantages over previous processes and utilizing the said material in a manner not analogous to any previous uses thereof, in order to produce a new and unobvious result.

This material will be hereinafter referred to as porous glass. For a detailed description of the process of manufacturing porous glass and a description of certain properties thereof, reference is made to U.S. Patent 2,215,039, issued to H. P. Hood and M. E. Nordberg. Other properties of the glass will be described during the course of the discussion of the present invention.

Porous glass is glass which contains an intricate network of minute interconnected voids and channels running therethrough. The process of manufacture disclosed in the cited patent whereby the void space is formed comprises generally the steps of forming an object of a glass within a certain composition range, subjecting the glass to heat treatment to separate it into two phases only one of which is soluble, and subsequently dissolving out the soluble phase to produce the void space.

Among the properties of porous glass which make it especially suitable as a separation medium are its extreme inertness, optical transparency, and small pore diameter, which varies between 20 and 100 angstrom units with an average of approximately 40. Due both to its extremely high surface area, which varies between about 150–200 m.$^2$ per gm., and to its high percentage of void space, which comprises about 28% of its volume, porous glass has the capacity to absorb water in amounts up to 25% of its dry weight, and other liquids are absorbed in similar amounts.

In general, separation processes utilizing porous glass are similar to those using conventional separation media, for example filter paper. In order to illustrate the advantages of processes utilizing porous glass, the process of the present invention will be illustrated with reference to the two previously described separation techniques. The advantages which accrue with each technique will be noted.

Preferred modes of the present invention will be described with reference to the accompanying drawings, wherein:

FIG. 1 illustrates apparatus which may be used in effecting chromatographic separations according to the process of the present invention, and FIG. 2 illustrates apparatus which may be used in effecting electrophoretic separations according to the process of the present invention.

Chromatographic separations may be effected as follows: First, a 2 microliter sample of ink is placed at location 10 in FIG. 1 about one-half inch from one edge of a small (e.g., 3 in. x 3 in. x 1/16 in.) piece of porous glass 11. Next, the same edge of the glass is dipped into the solvent 12, in container 13, which solvent may be, for example, water. The glass is retained in this position, as illustrated in FIG. 1, for a time sufficient to permit the solvent to permeate the glass piece and to distribute the ink in zones of differing color as generally illustrated in the figure. When the solvent used is water, this time is about 24 hours. Finally, the glass is removed, wiped dry with a soft cloth and placed in a warm place to remove completely the adsorbed moisture.

Chromatograms thus produced yield excellent separation of the individual components as a function of their relative solubilities, molecular sizes and shapes and the relative retardation effects of the porous glass. When, for example, the ink separated by this process was Carter's 986 black ink, the chromatogram comprised a deep blue spot where the original sample was placed, a deep green area above this, next an area of orange, and finally an area of red at the top. The respective areas are indicated approximately in FIG. 1. It should be understood that the color areas tend to blend together at their boundaries, although this blending could not be illustrated in the drawing.

As used in this process, porous glass exhibits numerous advantages over conventional chromatographic media. Due to the large surface area of the glass the sample is confined to a small area as the result of immediate drying. This, in cooperation with longer development time, provides improved resolution or definition of the color bands. The optical transparency of porous glass renders this resolution clearly visible. Porous glass can be used with nearly all solvents except hydrofluoric acid or some strong alakaline solutions, whereas heretofore many solvents could not be used on conventional media since they destroyed the media. Since glass is an inorganic, inert material, contamination of the sample is minimized. Heat treatment, which is impossible at temperatures above 350–400° C. with conventional chromatographic media, is possible with glass, thereby permitting observation of the relative rates of pyrolysis of the component bands of the chromatogram. In addition, the optical properties of glass permit measurement of such phenomena as transmission, reflectance and fluorescence.

These same advantages are apparent when porous glass is utilized as the medium for electrophoretic separations as indicated in FIG. 2. Here two beakers 20 are partially filled with an electrolyte 25, for example a solution of sodium barbiturate. Porous glass plate 22 is supported between the beakers, and strips of filter paper 23 and 24 are wrapped about the respective ends of the glass plate and held by means of clamps 28 and 29. The free ends of the pieces of filter paper extend into the electrolyte, and thus porous glass plate 22, which has previously been saturated with the electrolyte, is maintained in that condition by the addition of electrolyte soaked up by the filter paper strips and transferred to the plate by capillary action. A potential of, for example, 200 volts, illustrated by battery 21 connected to clamps 28 and 29, is imposed across plate 22. When a sample of a mixture containing differing charged particles, for example a mixture of glycine and alanine, is placed on plate 22, particle migration takes place and the result is a separation into components. In the example mentioned, particles of both glycine and alanine travel toward the cathode, but those of glycine travel further, as can be observed when the plate is subsequently exposed to a bromophenol blue stain.

It should be understood that no claim is made in this application either to porous glass itself or to its method of manufacture. The present invention resides in the described process for novel and previously unsuggested utilization of porous glass to effect a new and unobvious result.

What is claimed is:

1. A separation method comprising the steps of providing a piece of porous glass having a continuous system of intercommunicating void spaces having diameters varying within the range approximately 20–100 angstrom units, maintaining in contact with a porous surface of said porous glass a substance comprising at least two components which are soluble in a liquid, which separate from one another in solution and which diffuse through said porous glass at differing rates, supplying to said porous glass through a pervious surface thereof a liquid in which said substance is soluble in sufficient quantity to dissolve said substance, and maintaining said liquid in said porous glass until said substance separates into said components.

2. The method according to claim 1 which includes the additional step of applying an electrical potential across said porous glass containing said substance.

References Cited in the file of this patent

UNITED STATES PATENTS

| | | |
|---|---|---|
| 2,215,039 | Hood et al. | Mar. 19, 1934 |
| 2,723,756 | Miller et al. | Nov. 15, 1955 |
| 2,897,126 | George | June 28, 1959 |
| 2,943,059 | Beck et al. | June 28, 1960 |
| 2,962,426 | Sharpsteen | Nov. 29, 1960 |
| 2,989,457 | Van Oss et al. | June 20, 1961 |

FOREIGN PATENTS

| | | |
|---|---|---|
| 1,066,180 | Germany | Oct. 1, 1959 |

OTHER REFERENCES

"Acta Chemica Scandinavia," No. 4, 1950, pages 957–9, article by Haglund and Tiselius.

"Chromatography," by E. Lederer and M. Lederer, 2nd ed., published by Elsevier Publishing Company, 1957, pages 10–11.

"Glass Paper Chromatography," reprinted from Analytical Chemistry, vol. 31, page 1447, August 1959.